United States Patent [19]

Ogawa

[11] Patent Number: 5,016,156
[45] Date of Patent: * May 14, 1991

[54] HIGH VOLTAGE STABILIZING CIRCUIT

[76] Inventor: Atsuhisa Ogawa, c/o Fujisawakojo, Ikegami Tsushinki Co., Ltd., 400 Kozuka, Fujisawa-shi, Kanagawa, Japan

[*] Notice: The portion of the term of this patent subsequent to Jun. 1, 2004 has been disclaimed.

[21] Appl. No.: 654,019

[22] PCT Filed: Nov. 24, 1983

[86] PCT No.: PCT/JP83/00419
§ 371 Date: Aug. 6, 1984
§ 102(e) Date: Aug. 6, 1984

[87] PCT Pub. No.: WO84/02441
PCT Pub. Date: Jun. 21, 1984

[30] Foreign Application Priority Data

Dec. 8, 1982 [JP] Japan .................. 57-213937

[51] Int. Cl.⁵ .......................... H02M 3/335
[52] U.S. Cl. ..................... 363/21; 315/408; 315/411
[58] Field of Search .............. 363/21; 358/190; 315/408, 411

[56] References Cited

U.S. PATENT DOCUMENTS 3,519,741  7/1970  Knight .................. 358/190
3,706,023  12/1972 Yamada et al. ........... 315/411
3,803,446  4/1974  Faglioni ................ 358/190
4,484,113  11/1984 Haferl .................. 315/408

FOREIGN PATENT DOCUMENTS 17150    5/1974  Japan .
135421   11/1976 Japan .
134879   10/1981 Japan .

Primary Examiner—William H. Beha, Jr.
Attorney, Agent, or Firm—Fliesler, Dubb, Meyer & Lovejoy

[57] ABSTRACT

A high voltage stabilizing circuit comprises a high voltage generating circuit (FBT, D1) for boosting a pulse voltage (Vcp) generated from a horizontal deflection circuit (Q1, D2, Ct", Ly, Cs) during a flyback period of a horizontal deflection pulse, a flyback period control circuit (Q2, $C_B$, Rv, Ct') for performing switching operation only during the flyback period to control the flyback period, so that the high voltage (HV) is controlled, and a switching control resistor (Rv) for controlling the period of its switching operation.

14 Claims, 3 Drawing Sheets

HIGH VOLTAGE STABILIZING CIRCUIT

TECHNICAL FIELD

The present invention relates to a high voltage stabilizing circuit well adaptable for a monitoring apparatus using a cathode ray tube, a television receiver, a display device or the like.

BACKGROUND ART

In a conventional monitoring apparatus in which the removal of a high voltage variation is important, a high voltage generating circuit and a horizontal deflection circuit are provided separately and a stabilizing circuit is also provided in the high voltage generating circuit, although these arrangements are complicated. When considering cost reduction and power economy, however, a high voltage circuit of a so-called flyback transformer type in which a high voltage is generated by a flyback transformer serving both as the high voltage generating circuit and the horizontal deflection circuit, is superior to the above circuit arrangement.

FIG. 1 shows an arrangement of a conventional high voltage circuit of the flyback transformer type, which takes no measure for voltage stabilizing. In the circuit, when a drive pulse is applied to the base of a horizontal output transistor Q1, it produces a horizontal deflection pulse. During the flyback period of the horizontal deflection pulse, a collector pulse voltage Vcp is produced. After the voltage Vcp is boosted to a high voltage by a flyback transformer FBT, the boosted voltage is further rectified by a high voltage rectifying diode D1 to obtain an output of a DC voltage HV. Here, D2 designates a dumper diode, Ct a resonating capacitor, Ly a horizontal deflection coil, and Cs a DC blocking capacitor. A DC voltage Vcc is supplied to the terminal of the primary side of the flyback transformer FBT.

The collector pulse voltage Vcp is generally expressed by $$Vcp = Vcc\left(\frac{\pi}{2}\left(\frac{T_H}{T_R}\right) + 1\right), \quad (1)$$

where $T_H$ is the duration of one period of a horizontal deflection frequency, and $T_R$ is a flyback period.

When a load of the high voltage circuit is fixed, the DC high voltage HV is proportional to the collector pulse voltage Vcp. Accordingly, when the high voltage load varies and the DC high voltage HV decreases, if the flyback period $T_R$ in equation (1) is reduced, following proportionally the decrease of the DC high voltage HV, the collector pulse voltage Vcp increases and the DC high voltage HV also rises.

The flyback period $T_R$ is generally expressed by the following equation:

$$T_R = \pi\sqrt{Lyi \cdot Ctc}, \quad (2)$$

where Lyi is an inductance of the deflection coil Ly, and Ctc is a capacitance of a resonating capacitor Ct.

As seen from the above equations (1) and (2), if the inductance Lyi of the deflection coil Ly and/or the capacitance Ctc of the resonating capacitor Ctc is changed according to a variation of the high voltage load, the DC high voltage HV can be stabilized.

A conventional high voltage stabilizing circuit of the reactor type in which the inductance Lyi is changed has many disadvantages including poor transient response, heavy weight, large size, high manufacturing cost and so on. To overcome those disadvantages, another high voltage stabilizing circuit which controls the collector pulse voltage Vcp by changing a capacitance Ctc of the resonating capacitor Ct, is disclosed in Japanese Patent Application Laid-open No. 56-134879. In such a conventional stabilizing circuit, however, the control operation is continuously performed during periods other than the flyback period $T_R$. As a result, the circuit loss is large, and hence the power economy is not attained. Additionally, the circuit operation is not stable due to heat generation in the circuit.

DISCLOSURE OF THE INVENTION

Accordingly, with the view of removing the above-mentioned disadvantages, the present invention has an object to provide a high voltage stabilizing circuit in which the stabilization of the DC voltage and the power saving are both realized and the instability of the circuit operation due to the heating of the circuit is also removed.

To achieve the above object, in the present invention, a flyback period control circuit is operated only during the flyback period of the horizontal deflection pulse to control the flyback period according to a load variation of high voltage.

To be more specific, in the present invention, a high voltage stabilizing circuit has a high voltage generating means for boosting a pulse voltage produced during a flyback period of a horizontal deflection pulse produced from a horizontal deflection circuit, a flyback period control means for controlling the high voltage by performing switching operation only during the flyback period to control the flyback period, and a switching control means for controlling a period of the switching operation.

The flyback period control means may include a control transistor, a capacitor for differentiation connected between a first electrode (collector) and a control electrode (base) of a control transistor, and a resistor, for example, a variable resistor, connected between the control electrode (base) of the control transistor and a second electrode (emitter), and the pulse voltage is applied to the first electrode (collector) of the control transistor.

A diode may be connected between the control electrode (base) and the second electrode (emitter) of the control transistor.

To the first electrode (collector) of the control transistor, the pulse voltage may be supplied through a capacitor.

The switching control means may include a voltage dividing means for dividing the high voltage to have a divided voltage, and an error detecting means for comparing the divided voltage with a predetermined reference voltage to obtain an error voltage.

The voltage dividing means may include a resistor for dividing the high voltage and an amplifying circuit for amplifying the divided voltage.

The error detecting means may include a transistor to which the divided voltage or a voltage obtained by amplifying the divided voltage and the reference voltage are applied, so that an error voltage is derived from the transistor, and the error voltage is then applied to the flyback period control means.

BEST MODE FOR CARRYING OUT THE INVENTION

The present invention will be described in detail with reference to the accompanying drawings.

Figure 1:
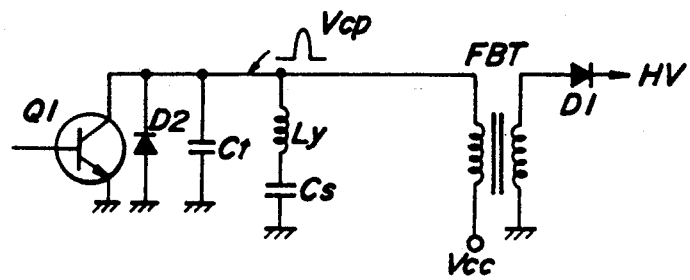
FIG. 1 is a circuit diagram showing an arrangement of a conventional high voltage circuit of the flyback transformer type.
Figure 2:
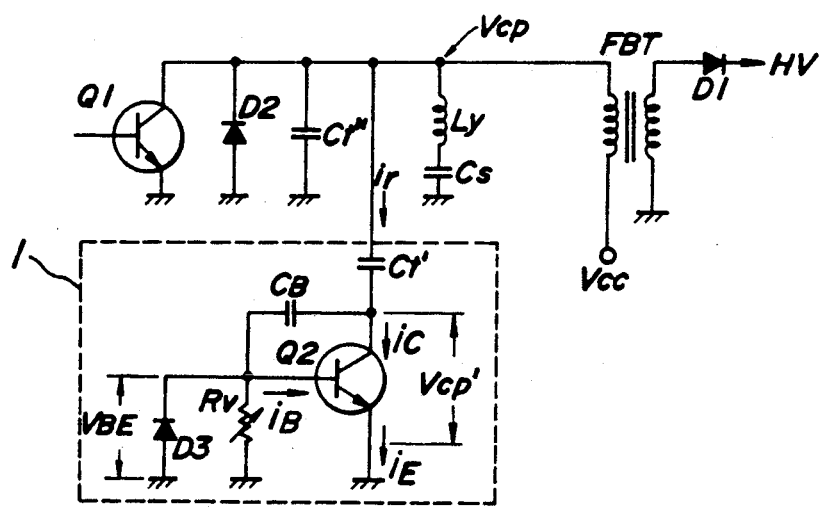
FIG. 2 is a circuit diagram showing an embodiment of an arrangement of a high voltage stabilizing circuit according to the present invention.

FIG. 2 shows an embodiment of an arrangement of a high voltage stabilizing circuit according to the present invention. In the figure, the same reference numerals as in FIG. 1 are used for designating like portions in FIG. 1, and no further explanation thereof will be given. In FIG. 2, reference numeral 1 designates a flyback period control circuit connected between the primary coil of the flyback transformer FBT and the collector of the horizontal output transistor Q1. As will be described later, only during the flyback period $T_R$ of a deflection current flowing into the horizontal deflection coil Ly does the control circuit 1 perform the switching operation to control the flyback period $T_R$. The flyback period control circuit 1 has a control transistor Q2 which performs the switching operation only during the flyback period $T_R$ by a control signal supplied to the base thereof, a differential capacitor $C_B$ connected between the collector and the base of the transistor Q2, a variable resistor Rv connected between the base of the transistor Q2 and the common potential and for setting a voltage to be applied to the base thereof, a protecting diode D3 connected in parallel with the variable resistor Rv between the base of the transistor Q2 and the common potential, and a resonating capacitor Ct' connected between the collector of the transistor Q1 and the collector of the transistor Q2. As shown, in the present embodiment, the resonating capacitor Ct shown in FIG. 1 is composed of the capacitors Ct' and Ct".

Figure 3:
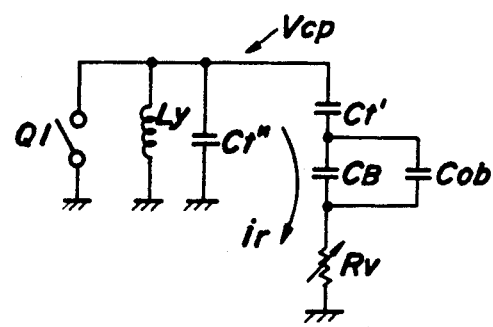
FIG. 3 is a circuit diagram showing an equivalent circuit of the circuit shown in FIG. 2.

The operation of the circuit shown in FIG. 2 will be described with referring to FIGS. 3, and 4A–4G. The circuit shown in FIG. 3 is an equivalent circuit depicted with neglecting the internal resistance of the transistor Q2 in FIG. 2, in which Cob is a capacitor between the collector and the base of the transistor Q2. FIGS. 4A–4G illustrate waveforms of currents and voltages at respective portions in the flyback period control circuit 1.

Figure 4:
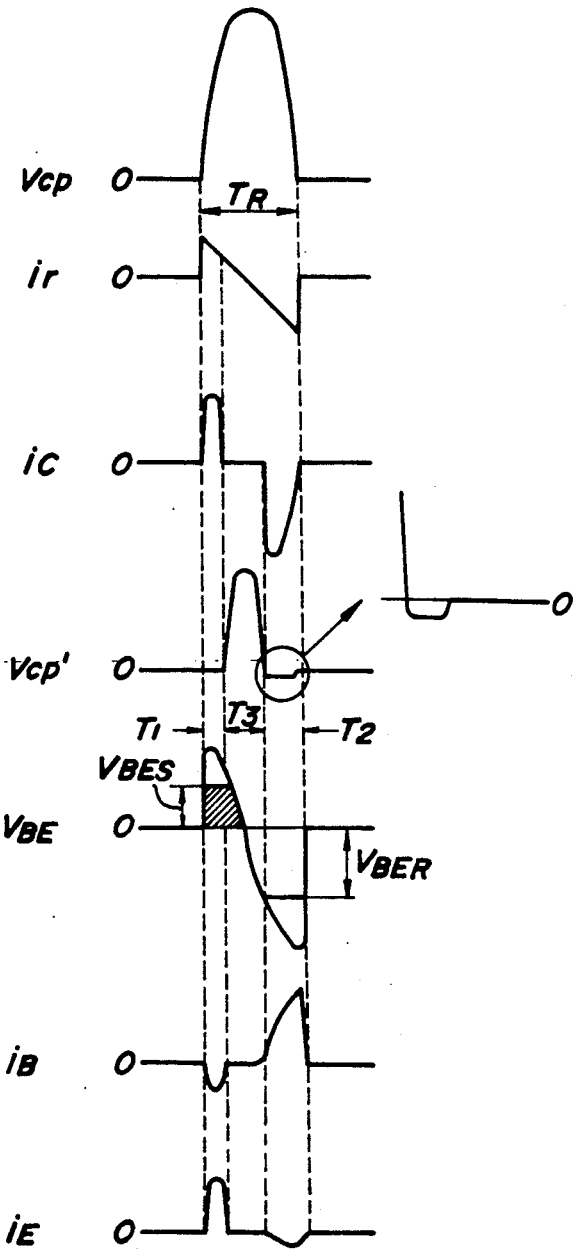
FIGS. 4A–4G are signal waveforms illustrating one example of currents and voltages at various portions in a flyback period control circuit shown in FIG. 2.

The current flowing into the variable resistor Rv is a resonating current $i_r$ supplied through the deflection coil Ly and the resonating capacitors Ct' and Ct", as shown in FIG. 3, and hence the current $i_r$ has a waveform as shown in FIG. 4B. A waveform of a voltage across the variable resistor Rv, i.e. a voltage VBE between the base and the emitter of the transistor Q2, is also substantially identical to that of the current $i_r$ (see FIG. 4E). The transistor Q2 is conductive when the base potential $V_{BE}$ of the transistor Q2 reaches the forward bias potential $V_{BES}$ in a slanted portion in FIG. 4E (see FIG. 4G).

In the negative portion of the waveform of the resonating current $i_r$ shown in FIG. 4B, the transistor Q2 is biased backward and when its base voltage $V_{BE}$ reaches $V_{BER}$, a backward current flows from the base to the collector of the transistor Q2 (see FIGS. 4C and 4F). At this time, the base potential of the transistor Q2 is clamped by the forward voltage of the diode D3 in order to protect the transistor Q2 from being broken (see FIG. 4D). In the figure, ic denotes the collector current of the transistor Q2, Vcp' the voltage between the collector and the emitter of the transistor Q2, $i_B$ the base current of the transistor Q2, and $i_E$ an emitter current of the transistor Q2.

Accordingly, the transistor Q2 performs the switching operation according to a change of the voltage $V_{BE}$ between the base and the emitter of the transistor Q2, and is conductive during a period T1 when it is forward-biased and a period T2 when it is backward-biased, and is interrupted during a period T3 between the periods T1 and T2.

If a resistance of the variable resistor Rv is changed, the voltage $V_{BE}$ across the resistor Rv changes and accordingly the conduction periods T1 and T2 change. In this manner, the switching timing of the transistor Q2 can be changed. For example, if the resistance of the variable resistor Rv is made zero, the bias current $i_B$ is not supplied to the transistor Q2, so that the resonance capacitance is the sum of the capacitances of the series-connected capacitors Ct' and $C_B$. Accordingly, the flyback connected capacitors Ct' and $C_B$. Accordingly, the flyback period $T_R$ is shortened and the DC high voltage HV rises.

On the other hand, when the resistance of the variable resistor Rv is increased and a forward bias voltage is applied to the transistor Q2, the transistor Q2 can be made conductive substantially during the entire flyback period $T_R$. The resonating capacitance increases, since the capacitors Ct' and Ct" are rendered to a condition that the capacitor Ct' is coupled in parallel to the capacitor Ct". Accordingly, the flyback period $T_R$ is extended and the DC high voltage HV drops (see equations (1) and (2)). Therefore, by changing the resistance of the variable resistor Rv according to a variation of the DC high voltage HV, the DC high voltage HV can be stabilized.

Figure 5:
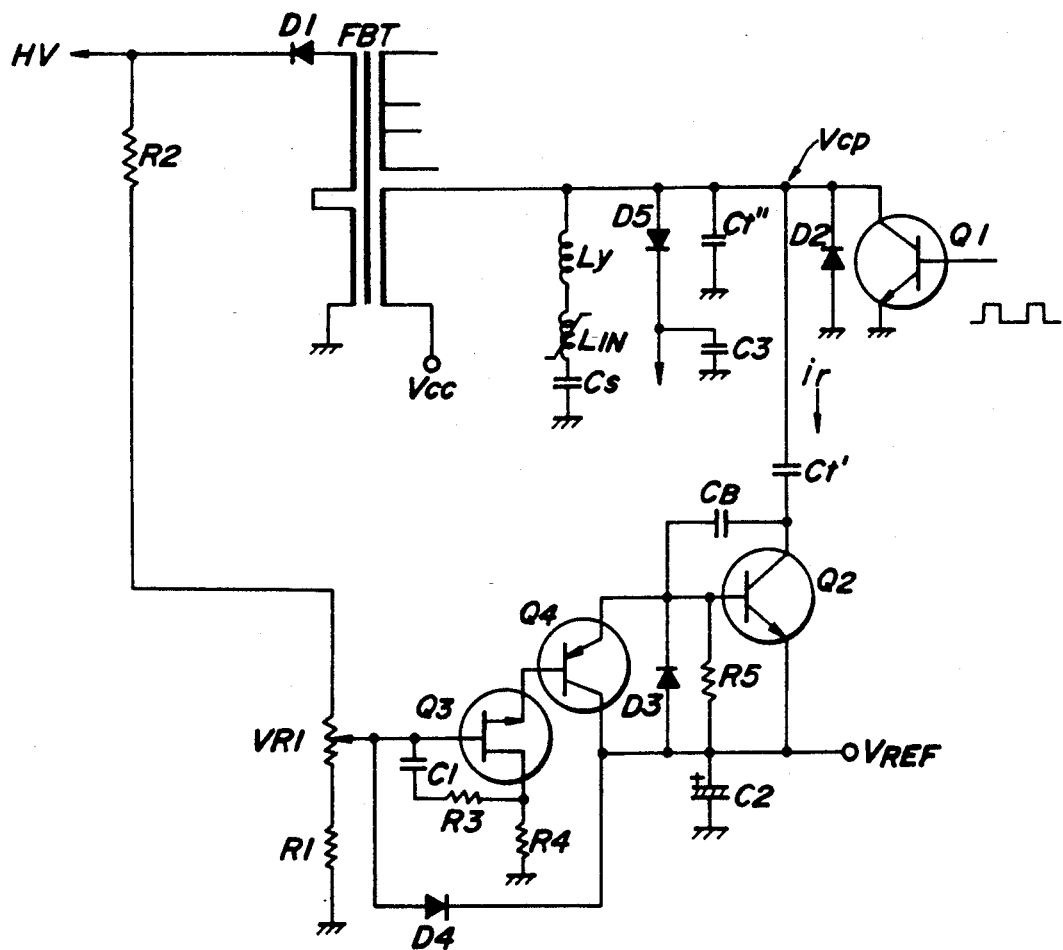
FIG. 5 is a circuit diagram showing another embodiment of an arrangement of a high voltage stabilizing circuit according to the present invention.

It is desirable, from a viewpoint of the high voltage stability, that the flyback period control circuit 1 is used in the form of a closed loop. Thus, another embodiment of a high voltage stabilizing circuit according to the present invention, which is designed so as to realize such a desirable arrangement, is shown in FIG. 5. In the figure, the same reference numerals as in FIG. 2 are used to designate like portions in FIG. 2. In the circuit, R1 and R2 represent, respectively, voltage dividing resistors for dividing the DC high voltage HV obtained from the high voltage side (secondary side) of the flyback transformer FBT, and VR1 a voltage dividing variable resistor for dividing the DC high voltage HV. These resistors R1, R2 and VR1 are connected in series and the resistor R1 has one terminal which is grounded. One terminal of the resistor R2 is connected to the secondary terminal of the flyback transformer FBT, through the high voltage rectifying diode D1.

A capacitor C1 and a resistor R3 are connected in series between the gate and the drain of a field effect transistor Q3, and a resistor R4 is connected between the drain thereof and the common potential. The collector of a transistor Q4 and the emitter of the transistor Q2 are connected to each other, and the emitter of a transistor Q4 and the base of the transistor Q2 are also connected to each other. A main power source, e.g. 110 V, of a monitoring apparatus or the like is applied as a reference voltage $V_{REF}$ to the collector of the transistor Q4. Connected between the collector of the transistor Q4 and the gate of the field effect transistor Q3 is a protecting diode D4 for preventing the application of an over-voltage.

A detected voltage formed by dividing the DC high voltage HV by the resistor R1 and the variable resistor VR1 is determined to be about 1/250 of the DC high voltage HV when the voltage HV is set, for example, at 27.5 KV. The detected voltage is applied to the gate of the field effect transistor Q3, through the sliding terminal of the variable resistor VR1. By changing the variable resistor VR1, the detected voltage can be adjusted at a desired value. The field effect transistor Q3 amplifies the detected voltage up to a given current level. The amplified output current is derived from the source of the field effect transistor Q3, and is supplied to the base of the error amplifying transistor Q4 connected to the source of the field effect transistor Q3.

An impedance between the collector and the emitter of the transistor Q4 changes in response to a change of the detected voltage applied to the base thereof, and therefore the transistor Q4 behaves like a variable resistance element corresponding to the variable resistor Rv shown in FIG. 2.

The reference voltage $V_{REF}$ is applied to the emitter of the transistor Q2 as well as the collector of the transistor Q4. A differential resistor R5 is connected between the base and the emitter of the transistor Q2, and an electrolytic capacitor C2 is connected between the emitter thereof and the common potential. To the collector of the horizontal transistor Q1, a DC voltage Vcc having the same potential as that of the reference voltage $V_{REF}$ is applied by way of the primary winding of the flyback transformer. Further, $L_{IN}$ designates a coil for deflection linearity correction, D5 a diode, and C3 a capacitor.

The operation of the circuit shown in FIG. 5 will now be explained.

A horizontal deflection drive pulse is applied to the horizontal transistor Q1 so that the transistor Q1 operates as a horizontal output circuit. Under this condition, during its flyback period $T_R$, a large collector pulse voltage Vcp is generated. The voltage Vcp is boosted by the flyback transformer FBT to generate the DC high voltage HV. In this case, the resonating current $i_r$ flows through the capacitors Ct' and $C_B$, and further into the resistor R5, so that a voltage $V_{BE}$ is produced between the base and the emitter of the transistor Q2. The waveform of the voltage $V_{BE}$ is substantially the same as that of the resonating current $i_r$, as described above (see FIGS. 4B and 4E).

Then, if the DC high voltage HV drops due to a variation of the load, the detected voltage obtained from the voltage division by the voltage dividing resistor R1 and the variable resistor VR1 drops, so that the drain current of the transistor Q3 increases. The current is supplied to the base of the transistor Q4 and an impedance between the collector and the emitter of the transistor Q4 decreases. The decrease of the impedance of the transistor Q4 shortens the conduction period of the collector current of the transistor Q2. As a result, an apparent capacitance of the capacitor Ct' decreases and the resonating capacitance reduces. Therefore, the collector pulse voltage Vcp increases and accordingly an average value of the DC high voltage HV increases, so that the DC high voltage HV is stabilized.

On the other hand, when the DC high voltage HV rises, the conduction periods T1 and T2 of the transistor Q2 are extended, while the interruption period T3 shown in FIG. 4E is relatively shortened. Accordingly, the resonating capacitance increases, and the flyback period TR increases. As a result, the collector pulse voltage Vcp drops, so that the DC high voltage HV is stabilized.

As seen from the foregoing description, the present embodiment employs a feedback control system in which a variation value of the DC high voltage HV is fed back to the control circuit to cancel the variation. Therefore, its operation stability is high. If the main power source of the monitoring apparatus or the like is directly used for the reference voltage $V_{REF}$ in the high voltage feedback, the provision of an additional reference voltage source is not required.

POSSIBLE APPLICATIONS IN THE INDUSTRY

As described above, according to the present invention, the switching control is performed only during the flyback period of the horizontal deflection pulse to stabilize the DC high voltage, so that the high voltage stabilizing circuit according to the present invention is suitable for saving power consumption, and can solve the problem that the circuit does not operate stably due to the heating of the circuit.

I claim:

1. A high voltage stabilizing circuit, comprising:
   high voltage generating means: for boosting a pulse voltage produced from a horizontal deflection circuit during a flyback period of a horizontal deflection pulse to obtain a high voltage;
   operations period control means for performing switching operations, only during said flyback period, to controls aid flyback period, the flyback period control means including a variable resistor for changing the resistance according to variations of the high voltage, thereby controlling said high voltage; and
   switching control means for controlling a period of said switching operation.

2. A high voltage stabilizing circuit according to claim 1, wherein said flyback period control means includes a control transistor having base, emitter and collector electrodes, a differential capacitor connected between the collector electrode of said control transistor and the electrode of said control transistor, and the variable resistor connected between said base electrode of said control transistor and a common potential, and said pulse voltage is applied to said base electrode of said control transistor.

3. A high voltage stabilizing circuit according to claim 2, wherein a diode is connected between said base electrode and said common potential.

4. A high voltage stabilizing circuit according to claim 2 or 3, wherein said pulse voltage is supplied to said base electrode of said control transistor through a capacitor.

5. A high voltage stabilizing circuit according to claim 4 wherein said switching control means includes voltage dividing means for dividing said high voltage to obtain a divided voltage, and error detecting means for comparing said divided voltage with a predetermined reference voltage to obtain an error voltage.

6. A high voltage stabilizing circuit according to claim 5, wherein said voltage dividing means includes resistors for dividing said high voltage and an amplifying circuit for amplifying the divided voltage.

7. A high voltage stabilizing circuit according to claim 6, wherein said error detecting means includes a transistor to which said divided voltage or a voltage obtained by amplifying said divided voltage and said reference voltage are supplied, and an error voltage is derived from said transistor and is then supplied to said flyback period control means.

8. A high voltage stabilizing circuit as set forth in claim 1 wherein if the variable resistance is made 0, the flyback period is shortened and the high voltage rises.

9. A high voltage stabilizing circuit as set forth in claim 8 wherein when the resistance of the variable resistor increases, the flyback period is extended and the output voltage drops.

10. A high voltage regulation circuit for use in a high voltage power supply circuit, the power supply circuit for supplying a high voltage to a cathode ray tube, the power supply circuit having a flyback transformer, a horizontal deflection circuit connected to a primary winding of said flyback transformer for supplying flyback pulses to the primary winding, and a step up rectifying circuit for rectifying the stepped up flyback pulses to obtain said high voltage which is supplied to said cathode ray tube, said regulation circuit comprising:
   a control transistor having an emitter connected to ground or a low impedance power source;
   a first capacitor connected between said primary winding of said flyback transformer and a collector of said control transistor;
   a second capacitor connected between said collector and a base of said control transistor;
   a diode connected between said base and said emitter of said control transistor; and
   a variable conductivity device connected between said base and said emitter of said control transistor, said variable conductivity device being driven in response to the change of said high voltage in a manner that the conductivity of said device increases when said high voltage decreases, thereby performing switching operation, the period of which is changed by said variable conductivity device, the variable conductivity device performing switching operation only during a flyback period of a horizontal deflection pulse to control said flyback period to control said high voltage.

11. The high voltage regulation circuit as claimed in claim 10, wherein said variable conductivity device is a variable transistor.

12. The high voltage regulation circuit as claimed in claim 10, further comprising:
   voltage dividing means for dividing said high voltage to obtain a divided voltage;
   and wherein said variable conductivity device includes error detecting means for comparing said divided voltage with a predetermined reference voltage to obtain an error voltage for controlling said control transistor.

13. The high voltage regulation circuit as claimed in claim 12, wherein said voltage dividing means includes resistors for dividing said high voltage and an amplifying circuit for amplifying the divided voltage.

14. The high voltage regulation circuit as claimed in claim 12, wherein said error detecting means includes a transistor to which said divided voltage and said reference voltage are supplied, so that an error voltage is derived from said transistor and is then supplied to said control transistor.

* * * * *

UNITED STATES PATENT AND TRADEMARK OFFICE
CERTIFICATE OF CORRECTION

PATENT NO. : 5,016,156

DATED : May 14, 1991

INVENTOR(S) : Atsuhisa Ogawa

It is certified that error appears in the above-identified patent and that said Letters Patent is hereby corrected as shown below:

Col. 6, line 39, change "operations" to --flyback--.

Col. 6, line 40, after "operations" delete --,--.

Col. 6, line 41, change "controls aid" to --control said--.

Col. 6, line 53, after "the" (first occurrence) insert the word --base--.

Signed and Sealed this

Thirteenth Day of October, 1992

Attest:

DOUGLAS B. COMER

*Attesting Officer*   Acting Commissioner of Patents and Trademarks